United States Patent [19]

Gilson

[11] Patent Number: 5,361,373

[45] Date of Patent: Nov. 1, 1994

[54] INTEGRATED CIRCUIT COMPUTING DEVICE COMPRISING A DYNAMICALLY CONFIGURABLE GATE ARRAY HAVING A MICROPROCESSOR AND RECONFIGURABLE INSTRUCTION EXECUTION MEANS AND METHOD THEREFOR

[76] Inventor: Kent L. Gilson, 255 N. Main St., Apt. 210, Salt Lake City, Utah 84115

[21] Appl. No.: 989,236

[22] Filed: Dec. 11, 1992

[51] Int. Cl.$^5$ ............................................ G06F 15/31
[52] U.S. Cl. .............................. 395/800; 364/232.23; 364/232.8; 364/229.4; 364/DIG. 1
[58] Field of Search ................ 395/800; 307/465, 466; 364/489, 716

[56] References Cited

U.S. PATENT DOCUMENTS

| | | | |
|---|---|---|---|
| 4,290,121 | 9/1981 | Boone et al. | 365/189.07 |
| 4,503,511 | 3/1985 | Vandierendonck | 364/716 |
| 4,578,771 | 3/1986 | O'Hara, Jr. | 364/716 |
| 4,645,953 | 2/1987 | Wong | 364/466 |
| 4,791,603 | 12/1988 | Henry | 395/800 |
| 4,796,229 | 1/1989 | Greer, Jr. et al. | 365/189.08 |
| 4,831,573 | 3/1989 | Norman | 364/716 |
| 4,870,302 | 9/1989 | Freeman | 307/465 |
| 4,876,466 | 10/1989 | Kondou et al. | 307/465 |
| 4,879,551 | 11/1989 | Georgiou et al. | 340/825.87 |
| 4,940,909 | 7/1990 | Mulder et al. | 307/465 |
| 4,967,107 | 10/1990 | Kaplinsky | 307/465 |
| 4,972,105 | 11/1990 | Burton et al. | 307/468 |
| 5,015,884 | 5/1991 | Agrawal et al. | 307/465 |
| 5,023,775 | 6/1991 | Poret | 395/800 |
| 5,081,375 | 1/1992 | Pickett et al. | 307/465 |
| 5,128,559 | 7/1992 | Steele | 307/465 |
| 5,233,539 | 8/1993 | Agrawal et al. | 364/489 |

OTHER PUBLICATIONS

Maya Gokhale et al., "Building and Using a Highly Parallel Programmable Logic Array," Supercomputing Research Center, Jan. 1991.

Jeffrey M. Arnold et al., "Splash 2," Supercomputing Research Center, 1992.

Hung-Cheng Hsieh et al., "Third-Generation Architecture Boosts Speed and Density of Field-Programmable Gate Arrays," IEEE 1990 Custom Integrated Circuits Conference.

N. Howard et al., "Reconfigurable Logic: Technology and Applications," Computing and Engineering Journal, Sep. 1992, pp. 235–240.

S. Monaghan et al., "Reconfigurable Special Purpose Hardware for Scientific Computation and Simulation," Computing and Control Engineering Journal, Sep. 1992, pp. 225–234.

Primary Examiner—Alyssa H. Bowler
Assistant Examiner—John Harrity
Attorney, Agent, or Firm—Harry M. Weiss

[57] ABSTRACT

An integrated circuit computing device is comprised of a dynamically configurable Field Programmable Gate Array (FPGA). This gate array is configured to implement a RISC processor and a Reconfigurable Instruction Execution Unit. Since the FPGA can be dynamically reconfigured, the Reconfigurable Instruction Execution Unit can be dynamically changed to implement complex operations in hardware rather than in time-consuming software routines. This feature allows the computing device to operate at speeds that are orders of magnitude greater than traditional RISC or CISC counterparts. In addition, the programmability of the computing device makes it very flexible and hence, ideally suited to handle a large number of very complex and different applications.

1 Claim, 3 Drawing Sheets

INTEGRATED CIRCUIT COMPUTING DEVICE COMPRISING A DYNAMICALLY CONFIGURABLE GATE ARRAY HAVING A MICROPROCESSOR AND RECONFIGURABLE INSTRUCTION EXECUTION MEANS AND METHOD THEREFOR

BACKGROUND OF THE INVENTION

1. Field of the Invention

This invention generally relates to integrated circuit computing devices, and, more specifically, relates to an integrated circuit computing device comprising a dynamically configurable gate array which has a microprocessor coupled to a reconfigurable instruction execution unit. This device can implement complex, time-consuming operations by reconfiguring the instruction execution unit to perform a specific function very quickly in hardware rather than implementing complex operations in time-consuming software routines.

2. Description of the Related Art

Most modern computers are based on a conventional Von Neumann architecture which executes software instructions in sequential fashion. Many modern computers are based on the microprocessor, which follows the traditional, sequential Von Neumann approach. In recent years the use of the microprocessor has become more widespread and varied, from special purpose microprocessors with special features suited to automotive and control applications (commonly known as microcontrollers) to the more highly-integrated general purpose microprocessors such as the Intel 80386 and 80486, which are used in IBM-compatible personal computers, and the Motorola 68020 and 68030, which are used in Apple McIntosh-compatible personal computers.

As the microprocessor matured from its infancy, its capabilities were increased by adding more circuitry to handle more complex functions. Many complex functions were added by implementing complex instructions in a sequence of low-level instructions within the microprocessor known as firmware. In this manner a MULTIPLY instruction within a typical microprocessor causes the microprocessor to generate a sequence of ADD and SHIFT instructions to accomplish the desired MULTIPLY function. If this MULTIPLY function could be carried out in hardware, the execution time for the MULTIPLY function could be reduced by orders of magnitude.

The microprocessor evolved over many years to become a very complex and powerful general purpose processor, capable of high levels of performance due to the large amount of circuitry and firmware dedicated to complex, high level functions. These high power, complex, general purpose microprocessors are known as Complex Instruction Set Computers (CISC), due to the features that would allow the execution of complex instructions.

In the early 1980s a new philosophy began to gain acceptance in the microprocessor field. This approach stripped the special purpose, complex circuitry and firmware out of the microprocessor and implemented instead a Reduced Instruction Set Computer (RISC). The RISC architecture concentrated on implementing each instruction within a simple instruction set in a single clock cycle. The underlying philosophy of the RISC architecture is to do fewer functions than the CISC architecture, but to do them very fast. As a result of the reduced, simplified instruction set, the amount of circuitry in a RISC is substantially less than that used in a CISC. So for a typical RISC machine, there is no MULTIPLY instruction. The MULTIPLY operation would be accomplished in a RISC machine by a software routing performing a series of ADD and SHIFT instructions. In many applications a RISC-based computer can outperform a CISC-based computer even though it must implement many of the CISC functions in software routines. This is due to the highly efficient instruction set where each instruction can be executed much faster than even the simplest instructions in a CISC-based computer. This improvement in speed usually more than makes up for the overhead in additional software.

Certain applications such as digital signal processing, video image generation, and complex mathematical calculations require functions that are not implemented within the complex hardware and firmware of the general purpose CISC. Some microprocessors have circuitry dedicated to perform certain of these complex functions in hardware, such as digital signal processors, video processors, or math processors. However, each of these is limited to its specific realm, is not suited to general-purpose use, and cannot be modified to perform a different type of high level function. For a general purpose CISC or RISC to perform these types of special, complex functions, they must be implemented in long, complex software routines that take a relatively long time to execute. A computer system that uses a CISC or RISC type microprocessor to perform these complex operations will spend a relatively large amount of time executing these complex operations when compared to the time spent performing other simpler functions.

A well-known rule with regards to problem solving is known as the Amdahl Rule, which states that 10% of the problem generally takes 90% of the time to solve the problem. This rule also applies to computers: 10% of the computer's operations generally take 90% of the computer's time. Assuming this is true, it is obvious that an improvement in the execution time of the 10% of the computer's functions that take 90% of the computer's time will directly and drastically improve the performance of the computer.

This bottleneck in computer speed could be lessened or eliminated by providing a microprocessor which could execute most of these time-consuming functions in hardware. Indeed, this is the precise approach used with special purpose microprocessors that suits them so well to their specific intended tasks. However, it is impossible from a practical standpoint to make a microprocessor with all conceivable high-level functions implemented in hardware and/or firmware. Constraints on semiconductor die size and system architecture make the building of a general purpose microprocessor which directly provides a large variety of high-level, complex functions impossible at this point in time.

Programmable logic devices are well-known in the electronics art, and have progressed from simple AND-OR arrays to very complex Field Programmable Gate Arrays (FPGAs), which have a large number of input/output (I/O) blocks, programmable logic blocks and programmable routing resources to interconnect the logic blocks to each other and to the I/O blocks. Many uses for these FPGAs have been found, with most being used to implement a high number of combinatorial logic functions, which results in lower part count, lower power dissipation, higher speed and greater system flexibility than if discrete components were used. Some FPGAs have been used to implement sequencers and other various forms of state machines which are essentially combinatorial in nature. Thus, the vast majority of the applications for the typical FPGA are for combinatorial logic functions.

In recent years FPGAs based on Random Access Memory (RAM) were introduced by several manufacturers, including XILINX. The basic configuration of the XILINX FPGA is described in U.S. Pat. No. 4,870,302 to Freeman, which is assigned to XILINX, and is incorporated herein by reference. In addition, the technical features of XILINX FPGAs are described in *The Programmable Gate Array Data Book*, (XILINX 1992). The XILINX RAM-based FPGA has multiple I/O blocks, logic blocks and routing resources. The routing resources are used to interconnect the logic blocks to each other and to the I/O blocks, and to connect the I/O blocks through the I/O pads to the pins of the FPGA. The programming of the FPGA is accomplished by loading configuration data into the Configuration Memory Array of the FPGA. Since the XILINX FPGA is RAM-based, when power is first applied to the FPGA it has not yet been configured. Once the configuration data has been loaded into the Configuration Memory Array, the FPGA is ready for operation.

Dynamic reprogramming of the XILINX FPGA is not a novel concept since XILINX specifically acknowledges this potential use for the FPGA. Yet in most applications known in the prior art, the FPGA is reconfigured only to provide a different combinatorial logic function, and has not been used to implement a general purpose computing device. If a general computing device could be constructed within an FPGA, greater system flexibility would be achieved.

The Supercomputing Research Center in Bowie, Maryland, has succeeded in implementing a computing device within a XILINX RAM-based FPGA. Two computers have been built with this architecture, the SPLASH 1 which is discussed in Maya Gokhale et al., *Building and Using a Highly Parallel Programmable Logic Array* (Supercomputing Research Center, Jan. 1991) and the SPLASH 2 which is discussed in Jeffrey M. Arnold et al., SPLASH 2 (Supercomputing Research Center, 1992). To achieve high-speed operation the XILINX FPGAs are placed in a systolic array which distributes the computing among the FPGAs to accomplish a high level of parallel processing. This systolic array configuration results in greatly increased computing speed due to the shared parallel execution of functions, but requires the use of many XILINX FPGAs and a great deal of software overhead to distribute the processing to accomplish this high level of performance.

In summary, general-purpose CISC and RISC machines are not well-suited to fast execution of complex operations. Special-purpose processors execute a limited number of complex operations very quickly, but cannot be configured for operations outside their limited specialty, and are not well-suited as general purpose computing devices. Although some of these limitations are addressed by the SPLASH 1 and SPLASH 2 computers, these are very complex and expensive parallel processing computers that require many FPGAs arranged in a systolic array.

Therefore, there existed a need to provide an integrated circuit computing device which is implemented in a single FPGA which can effectively execute the most complex, time-consuming functions in hardware by dynamically reconfiguring the FPGA so the instruction execution unit is modified to execute the desired operation in hardware. Implementing these time-consuming operations in hardware results in a substantial increase in speed of the computing device when compared to conventional approaches.

SUMMARY OF THE INVENTION

It is an object of this invention to provide an integrated circuit computing device and method having a microprocessor and a reconfigurable instruction execution unit which can be dynamically configured to implement a variety of high level functions in hardware, thereby drastically improving system speed.

It is another object of this invention to provide an improved integrated circuit computing device and method having a microprocessor and a reconfigurable instruction execution unit which is implemented in a dynamically-configurable gate array.

It is a further object of this invention to provide an improved integrated circuit computing device and method having a microprocessor and a reconfigurable instruction execution unit which is implemented in a RAM-based Field Programmable Gate Array (FPGA)

It is a still further object of this invention to provide a computer system and method having at least two integrated circuit computing devices which each have a microprocessor and a reconfigurable instruction execution unit which can be dynamically configured to implement a variety of high-level functions in hardware, thereby drastically improving system speed.

According to the present invention, an integrated circuit computing device is provided. This computing device is implemented in an FPGA such as the RAM-based XC3020 FPGA by XILINX. The number of logic blocks and routing resources available in the XILINX FPGA makes it well suited for implementing a simple microprocessor such as a RISC Processor. This RISC Processor is coupled to a unique instruction execution unit that can be reconfigured to implement a variety of very complex operations in hardware. This is accomplished by dynamically reprogramming the FPGA such that the instruction execution unit is reconfigured to perform the appropriate operation while most of the remaining functions within the FPGA remain unaltered. To dynamically reprogram the FPGA, new configuration data must be written into the Configuration Memory Array. For the XILINX XC3020, this nominally takes about 1.5 milliseconds (ms), during which time the function of the microprocessor is suspended. The hardware execution of the complex operation once the FPGA is reconfigured nominally takes only a few clock cycles, which is insignificant compared to the time spent to reconfigure the FPGA. Thus, regardless of the specific FPGA used, great improvements in system execution time are realized when the software or firmware implementation of the complex operation would take significantly longer than the time required to reconfigure the FPGA to execute the instruction in hardware.

One specific example of the degree of performance enhancement available from this type of computing device is a digital audio post-processor which is used to digitally sample and filter an audio signal. Implementing the algorithm for the audio post-processing by taking advantage of the reconfigurability of the instruction execution unit results in speeds up to 60 times faster than for a conventional CISC processor.

Greater improvements still can be realized by using two or more XILINX FPGAs in a pseudo-parallel arrangement. These FPGAs are not parallel in the sense that they share computational tasks and perform them at the same time, but they are parallel in the sense that, while one is being reconfigured and is therefore idle, one of the others can continue executing. Thus system performance can be greatly enhanced even when the software execution time does not greatly exceed the time required to reconfigure the FPGA.

The foregoing and other objects, features and advantages will be apparent from the following description of the preferred embodiment of the invention as illustrated in the accompanying drawings.

DESCRIPTION OF THE PREFERRED EMBODIMENT

Figure 1:
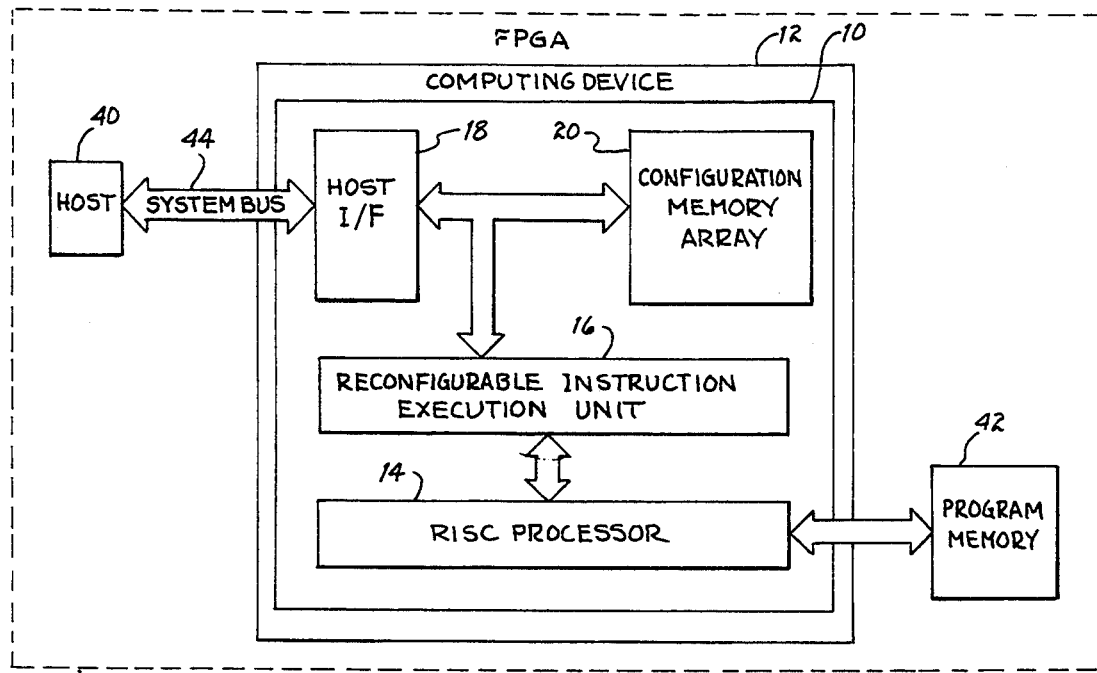
FIG. 1 is a block diagram of the computing device of the present invention when used as a component in a high-speed computer system.

FIG. 1 shows a block diagram of the computing device 10 of the present invention when used in a high-speed computing system 48. The computing device 10 is implemented within a Field Programmable Gate Array (FPGA) 12, and has a RISC Processor 14, a Reconfigurable Instruction Execution Unit 16, a Host Interface (I/F) 18, and a Configuration Memory Array 20. The Host Interface 18 is coupled to an external Host 40 via System Bus 44. The Host 40 controls the configuration of FPGA 12 by loading new configuration data through Host Interface 18 into the Configuration Memory Array 20 of FPGA 12 as required by the specific operation. RISC Processor 14 is coupled to Program Memory 42 which contains the code (instructions) for RISC Processor 14.

Figure 2:
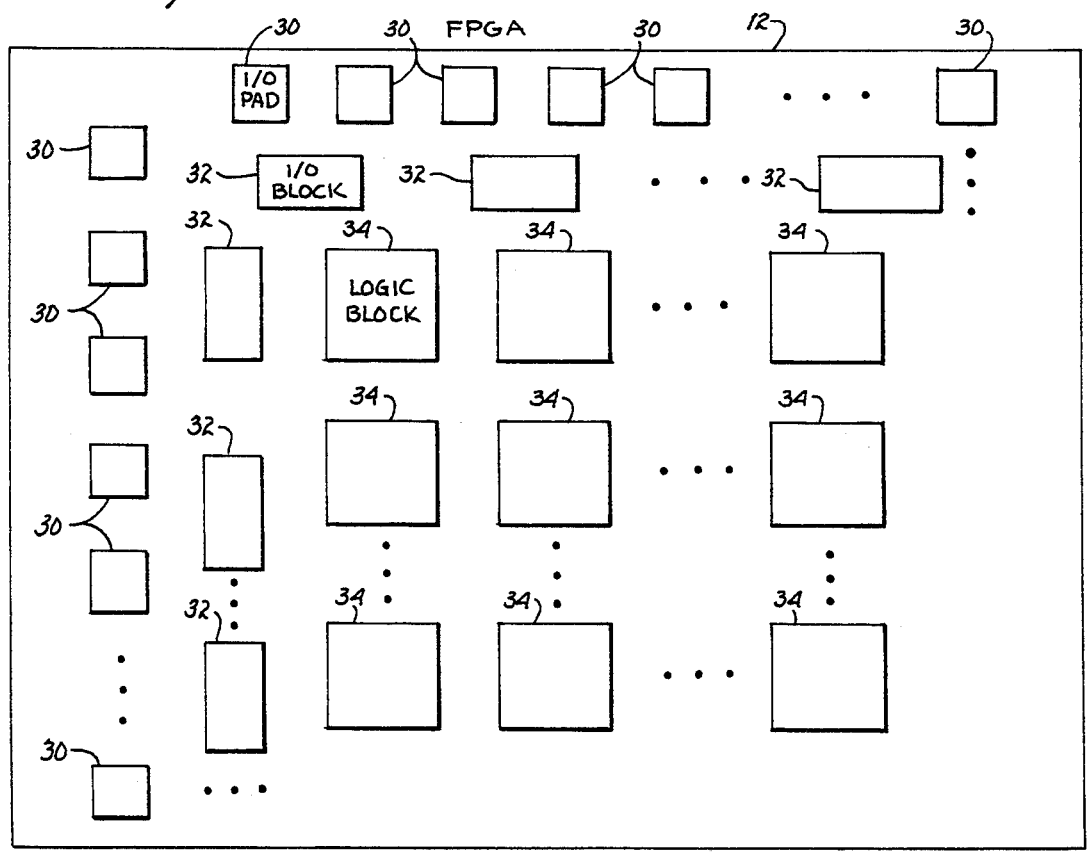
FIG. 2 is a block diagram of the FPGA shown in FIG. 1.

The FPGA 12 of FIG. 1 is shown in more detail in FIG. 2. This FPGA is typically a RAM-based FPGA similar to the XILINX XC3000 series of FPGAs. The specific configuration of each of the XC3000 series of XILINX FPGAs is given in detail in *The Programmable Gate Array Data Book*, (XILINX 1992). The FPGA represented in FIG. 2 is comprised of I/O Pads 30, I/O Blocks 32, Logic Blocks 34, and Routing Resources (not shown). The I/O Pads 30 are contacts on the FPGA 12 that are bonded to metal pins or contacts (not shown) which connect the FPGA 12 to circuitry external to FPGA 12. The I/O Blocks 32 are programmable blocks that can be configured to provide input or output signals to the I/O Pads 30 of FPGA 12, and can also be programmed with such features as signal feedback into FPGA 12 or registered inputs and outputs.

The Logic Blocks 34 contain circuitry that be programmed to perform a myriad of different functions. The specific configuration of the Logic Blocks 34 is not critical, provided the Logic Blocks 34 provide the required minimum level of functionality to implement the desired circuitry. The Routing Resources (not shown) are a large number of conductors that cross at numerous points within FPGA 12 controlled by programmable pass transistors, and, once properly programmed, the pass transistors and Routing Resources provide the majority of the signal paths between the I/O Pads 30, the I/O Blocks 32, and the Logic Blocks 34. These programmable pass transistors are programmed by the Host 40 writing configuration data through Host Interface 18 to Configuration Memory Array 20.

The FPGA 12 is a general purpose, programmable device. The I/O Blocks 32 and the Logic Blocks 34 can each be programmed to perform specific functions, and the Routing Resources can be programmed to interconnect the I/O Blocks 32 with the I/O Pads 30 and the Logic Blocks 34 to achieve the desired overall function of the computing device 10. Note that many other circuits may be implemented in FPGA 12 simultaneously with the components shown in FIG. 1 to add flexibility and power according to the specific application. The result of this flexible architecture is a user-configurable integrated circuit capable of a very high level of performance.

Since the FPGA 12 is RAM-based, it is programmed by writing configuration data into the Configuration Memory Array 20. This configuration data controls pass transistors within the FPGA 12 to appropriately configure the I/O Blocks 32, the Logic Blocks 34, and the Routing Resources so the desired circuitry is implemented within the FPGA 12. The XILINX XC3020 FPGA can be programmed in either parallel or serial modes. In either case, the Configuration Memory Array is filled with configuration data from an external source, which programs the FPGA 12 to perform the desired functions. The configuration of FIG. 1 uses serial mode to serially shift all the bits of the configuration data into Configuration Memory Array 20.

Many previous applications of the FPGA include very complex combinatorial circuits, or various sequencers or state machines. The most common use of the FPGA is to replace a large number of discrete integrated circuits by implementing these many functions in a single FPGA. But as the FPGA has increased in complexity and gate count, the complexity of the functions that could be implemented in the FPGA has also dramatically increased. With the RISC architecture that requires so much less circuitry than the traditional CISC microprocessor, it is now possible to implement a small RISC processor within a portion of the XILINX XC3020 FPGA. But the implementation of a RISC processor within a FPGA is not, in and of itself, greatly significant. Any person skilled in the microprocessor art could implement a RISC processor within a FPGA given the necessary level of complexity and functionality within the FPGA.

The computing device 10 of the present invention, however, is not a typical RISC processor. Included within FPGA 12 is a Reconfigurable Instruction Execution Unit 16. A typical RISC processor has a fixed instruction execution unit where all data manipulations are performed. The Reconfigurable Execution Unit 16 of the present invention allows the FPGA 12 to execute extremely complex instructions in a very short time, which greatly boosts the speed and performance of the computer system using the computing device 10.

OPERATION

The operation of the computing device 10 of the present invention is best understood by referring to FIG. 1. Once the FPGA 12 is powered up, it must be initially configured or programmed by the Host 40. The Host 40 thus writes the appropriate configuration data into the Configuration Memory Array 20, which programs the FPGA 12 to the appropriate initial state. The RISC processor 14 then begins executing its program from Program Memory 42. For illustrative purposes with the system shown in FIG. 1, it is assumed that the Host 40 is the "master" and the computing device 10 within FPGA 12 is a "slave" to Host 40. In this configuration the Host 40 is a computer capable of general-purpose functions. As the Host 40 executes its program, it may encounter a complex, time-consuming operation. When a complex operation is needed that would require a relatively long time to execute, and which can be implemented instead in hardware, Host 40 reconfigures the FPGA 12 for that particular operation by initiating the programming sequence for the FPGA 12 which causes new configuration data to be written into the Configuration Memory Array 20. Now referring to FIG. 2, the effect of this new configuration data is to leave the programming of the I/O Blocks 32 unchanged, to leave the programming of the Logic Blocks 34 that comprise the RISC processor 14 unchanged, but to change the programming of the Logic Blocks 34 that comprise the Reconfigurable Instruction Execution Unit 16 such that the desired complex operation can be accomplished by the newly configured hardware on data that already exists within the Reconfigurable Instruction Execution Unit 16. Once the desired operation is complete, the FPGA 12 can signal the Host 40 and transfer the data to Host 40, if required.

This operation allows the computing device 10 of the present invention to execute many different and complex operations in hardware rather than in long, time-consuming software routines. Since the Reconfigurable Instruction Execution Unit 16 within computing device 10 can be dynamically reconfigured to accomplish each of these complex operations in programmable hardware rather than employing fixed, special-purpose circuitry for each operation, the computing device 10 provides great flexibility and power with a minimum of circuitry.

The advantage provided by this flexible and powerful Reconfigurable Instruction Execution Unit 16 comes at the expense of the time required to program or reconfigure the FPGA 12. In the case of the XILINX XC3020, the configuration data consists of 14,779 bits of data. Let's assume the clock rate of the XC3020 is set to be 10 MHz, giving a period of 100 ns. If the XC3020 is configured to serially shift this configuration data into its Configuration Memory Array 20, the time required to complete configuration will nominally be:

$$14,779 \times 100 ns = 1.48 ms$$

With a programming time of 1.48 ms, the operation executed in hardware through the reconfiguring of the Reconfigurable Instruction Execution Unit 16 must be significantly greater than 1.48 ms (in this specific example) for any appreciable speed improvement to occur. But even assuming this conservative estimate of 1.48 ms, there are currently many complex operations such as matrix calculations and Fourier transforms that would typically require execution time that is orders of magnitude greater than the 1.48 ms required to reprogram the FPGA 12, resulting in substantial improvements in system speed.

Figure 3:
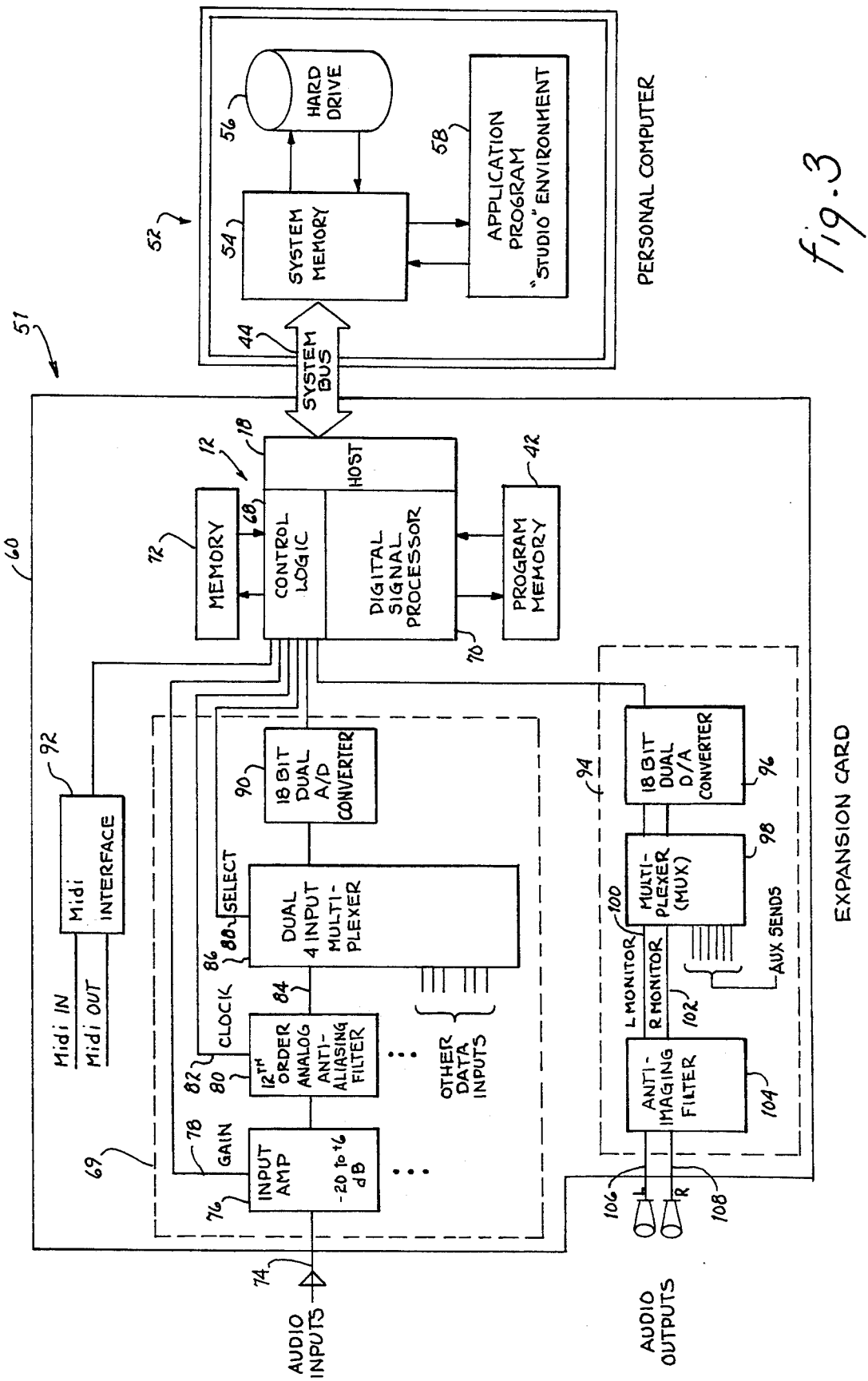
FIG. 3 is a block diagram of a computer system using the computing device of FIG. 1 to digitally sample and filter up to 8 audio input channels.

FIG. 3 shows one specific implementation of the computing device 10 of FIG. 1 when used in conjunction with an IBM-compatible Personal Computer (PC) 52 to implement a Digital Recording Studio 51 which digitally samples, filters and records up to 8 channels of audio input simultaneously. The PC 52 includes System Memory 54, Hard Drive 56, and an Application Program 58. This Application Program 58 is software which generates a studio environment for recording and filtering the audio inputs, and nominally runs under Microsoft Windows.

The expansion card 60 contains the circuitry to implement the functions unique to the Digital Recording Studio 51, and is plugged into one of the expansion slots of the PC 52. In this manner the PC 52 (of FIG. 3) is the Host 40 shown in FIG. 1, and communicates with and controls expansion card 60 via the System Bus 44. The XILINX 3000 series FPGA 12 contains a computing device 10 shown in FIG. 1, which is comprised of a Host Interface 18, Control Logic 68, and a Digital Signal Processor (DSP) 70 (as shown in FIG. 3). The DSP 70 is implemented using the RISC Processor 14 and Reconfigurable Instruction Execution Unit 16 as shown in FIG. 1, along with other support circuitry within the FPGA 12 that is not shown in the figures. As shown in FIG. 3, Control Logic 68 is coupled to Memory 72. Digital Signal Processor 70 is coupled to Program Memory 42, similar to the configuration shown in FIG. 1.

Control Logic 68 controls the function of the audio input portion 69 of the expansion board 60. This board can have up to eight Audio Input Channels 74. Each channel 74 has its own Input Amp 76, which has programmable gain 78 set by Control Logic 68. The output of Input Amp 76 is connected to the input of a 12th-Order Analog Anti-Aliasing Filter 80 which is also controlled by a Clock 82 from Control Logic 68. The output of this Anti-Aliasing Filter 80 is connected to one of the eight data inputs 84 on a Dual 4-to-1 Multiplexer (MUX) 86. The Select Lines 88 of MUX 86 are controlled by Control Logic 68, which selects which audio input channel 74 will be processed. The MUX 86 routes the appropriate signal to a Dual 18-bit Analog-to-Digital (A/D) Converter 90, which converts the analog input signal to a digital representation, which is then transferred to DSP 70. DSP 70 then performs the appropriate digital signal processing functions through a combination of the RISC Processor 14 within FPGA 12 executing its program and the PC 52 reconfiguring FPGA 12 such that the Reconfigurable Instruction Execution Unit 16 within DSP 70 performs the most time-intensive operations quickly in hardware. Once the digital audio data has been appropriately filtered by DSP 70, it can be written through the Host Interface 18 to the System Bus 44 into System Memory 54, then to the Hard Drive 56. In this manner up to eight channels of real-time audio can be processed and stored by the Digital Recording Studio 51 of FIG. 3. Note that the Control Logic 68 can be controlled by an external device through a Midi Interface 92, which is an industry-standard interface for small computer control of audio equipment. This allows the Digital Recording Studio 51 to be remotely controlled by an external keyboard or other electronically controlled equipment.

The Digital Recording Studio 51 also contains an Analog Output Portion 94 for playing back the audio data stored on Hard Drive 56. The digital audio data on Hard Drive 56 goes through System Memory 54 to the System Bus 44, through Host Interface 18 to DSP 70, which operates on the data. DSP 70 then outputs a processed digital representation of the audio data to an 18-bit Dual Digital to Analog (D/A) Converter 96. A MUX 98 routes the analog signals 100 and 102 to Anti-Imaging Filters 104, then to a Left Audio Output 106 and a Right Audio Output 108. These Audio Outputs 106 and 108 can then be routed through an external amplifier to speakers for the playback of the recorded audio data.

The Digital Recording Studio 51, with its eight channels of audio input and its two channels of audio output, can filter and mix the input audio signals as the user directs via the Application Program 58. This Application Program 58 can be very complex and provide numerous sophisticated functions. This Digital Recording Studio 51 can be implemented with a PC 52 and Expansion Card 60, which are both constructed of relatively low-cost components. Through the high level of specialized functionality gained through using the computing device 10 within FPGA 12 in the Digital Recording Studio 51, the functions of a very complex and sophisticated digital audio system can be implemented very simply and inexpensively.

Figure 4:
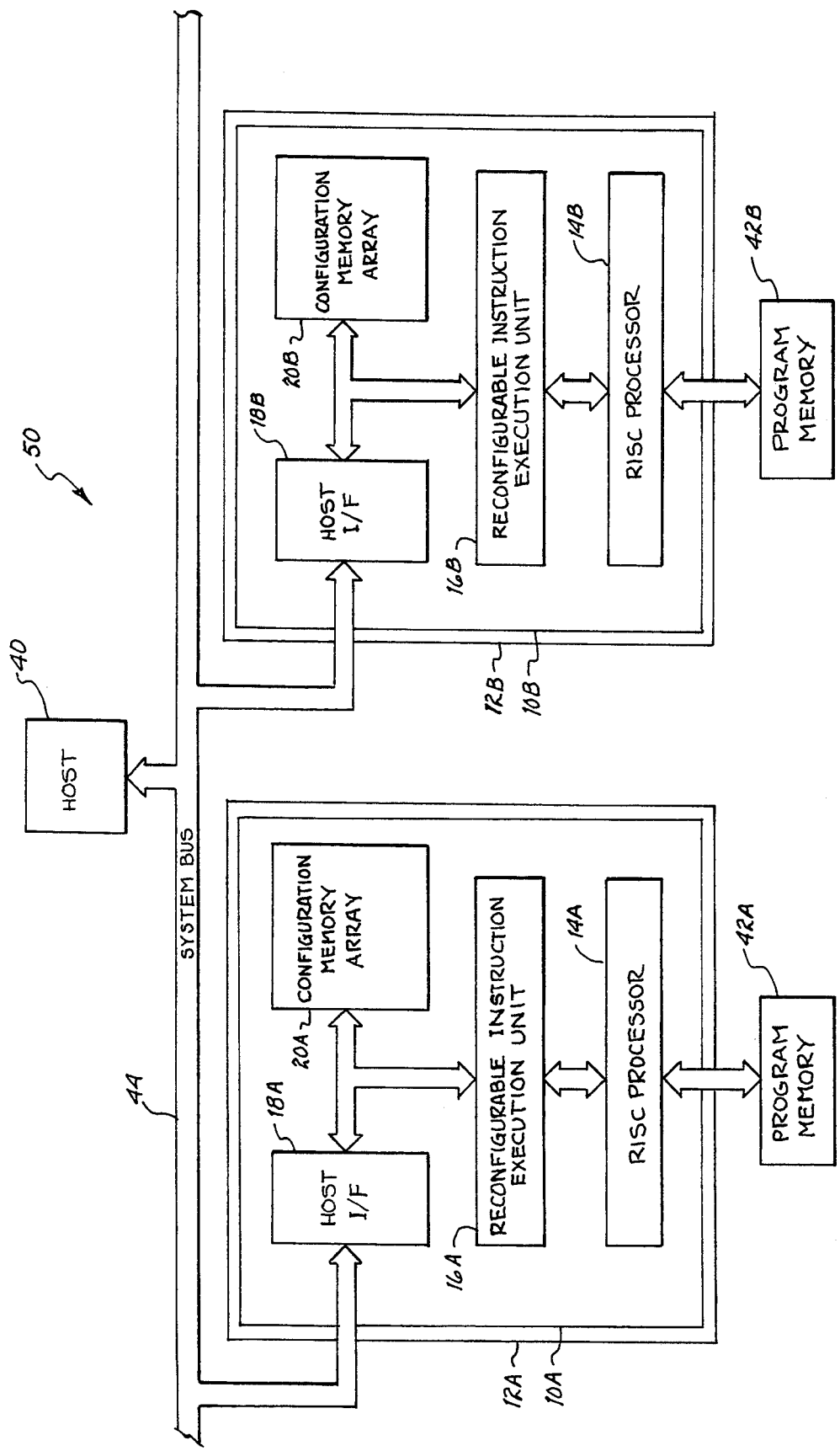
FIG. 4 is a block diagram of a computer system that uses two of the computing devices of the present invention in pseudo-parallel fashion which further increases the speed of the system.

An alternate embodiment of the present invention includes the use of two FPGAs 12A and 12B in a pseudo-parallel arrangement, as shown in the computing device 50 of FIG. 4. The two FPGAs 12A and 12B are coupled to the same Host 40 via System Bus 44 as shown, and the internal configuration of the RISC Processor 14 in each is nominally identical. These FPGAs 12A and 12B operate in pseudo-parallel manner, which means that while one FPGA 12A is in the process of being reconfigured by the Host 40, the second FPGA 12B can be executing a complex operation. In this manner the Host 40 has access to multiple slave processors 12A and 12B so program execution in Host 40 is not limited by having only one FPGA. For example, as FPGA 12A executes an operation at the command of Host 40, the second FPGA 12B can then be configured by the Host 40 for the next complex operation. In this manner the FPGAs 12A and 12B are used by the Host 40 in sequential manner, with one active while the other is being reconfigured. This allows the execution of the computing device 50 to continue during reconfiguration of the FPGAs, which further increases the speed of the computing device 50. Needless to say, more than two FPGAs could be used in the computing device 50 of FIG. 3.

While the invention has been described in its preferred embodiment, it is to be understood that the words which have been used are words of description rather than limitation, and that changes may be made within the purview of the appended claims without departing from the true scope and spirit of the invention in its broader aspects. For example, the RISC Processor 14 could be the "master" with the Host 40 being a "slave" which simply reconfigures FPGA 12 on command. The computing device 10 of the present invention, while described as being implemented within a XILINX RAM-based FPGA 12, could also be implemented as a custom semiconductor device with specialized control circuitry for particular applications. In addition, the FPGA need not necessarily be RAM-based if developments in other technologies such as EEPROMS make the use of other types of reconfigurable circuitry desirable. The Host 40 could have access to the Program Memory 42, and could therefore write into Program Memory 42 the actual program the RISC Processor 14 within FPGA 12 executes. While the disclosure herein describes only the Reconfigurable Instruction Execution Unit as changing during reconfiguration of the FPGA 12, it is an obvious extension of this invention that the attributes of the RISC Processor 14, the Bus Interface 18, and other circuitry within the FPGA 12 could all be modified as needed during reconfiguration of the FPGA 12.

What is claimed is:

1. A method of high-speed computing comprising the steps of:
    providing a plurality of dynamically configurable gate arrays each having a plurality of input/output (I/O) pads, a plurality of I/O blocks, a plurality of programmable logic blocks, a plurality of programmable routing resources for interconnecting said I/O pads, said I/O blocks and said logic blocks, and programming means for programming said I/O blocks, said logic blocks and said routing resources, said programming means defining an appropriate mode of operation for said gate array;
    providing microprocessor means coupled to an external source and implemented within each of said gate arrays by programming said programming means for processing instructions received from said external source;
    implementing reconfigurable instruction execution means within each of said gate arrays by programming said programming means, said reconfigurable instruction execution means being coupled to said microprocessor means for receiving and processing information received from at least one of said microprocessor means and said external source and for performing manipulation and computation of data contained within said logic blocks of said gate arrays according to said information received;
    reconfiguring said reconfigurable instruction execution means by programming said programming means to change said reconfigurable execution means so an operation on data within said reconfigurable execution means is carried out by circuits within said gate arrays after said reconfiguring is complete; and
    programming a first of said plurality of dynamically configurable gate arrays to perform computations while said external source dynamically reconfigures a second of said plurality of dynamically configurable gate arrays.

* * * * *